US008622203B2

(12) United States Patent
Poels et al.

(10) Patent No.: US 8,622,203 B2
(45) Date of Patent: Jan. 7, 2014

(54) DEVICE FOR SORTING PRODUCTS

(75) Inventors: Rob Theodorus Maria Poels, Uden (NL); Johannes Gerardus Adrianus Marinus Verbunt, Helmond (NL); Martinus Johannes Maria Vertogen, Zeeland (NL)

(73) Assignee: Vanderlande Industries B.V., Veghel (NL)

( * ) Notice: Subject to any disclaimer, the term of this patent is extended or adjusted under 35 U.S.C. 154(b) by 190 days.

(21) Appl. No.: 13/126,555

(22) PCT Filed: Nov. 6, 2009

(86) PCT No.: PCT/NL2009/050673
§ 371 (c)(1),
(2), (4) Date: Jun. 10, 2011

(87) PCT Pub. No.: WO2010/053367
PCT Pub. Date: May 14, 2010

(65) Prior Publication Data
US 2011/0233033 A1    Sep. 29, 2011

(30) Foreign Application Priority Data

Nov. 7, 2008 (NL) ..................................... 1036169

(51) Int. Cl.
*B65G 47/34* (2006.01)
*B65G 17/06* (2006.01)
(52) U.S. Cl.
CPC .............. *B65G 47/34* (2013.01); *B65G 17/065* (2013.01)
USPC ....................... 198/845; 198/850; 198/370.02
(58) Field of Classification Search
USPC ..................... 198/370.02, 845, 850
See application file for complete search history.

(56) References Cited

U.S. PATENT DOCUMENTS

| | | | |
|---|---|---|---|
| 5,595,279 A | 1/1997 | Wilkins et al. | |
| 7,086,519 B2 * | 8/2006 | Veit et al. | 198/370.02 |
| 7,506,744 B2 * | 3/2009 | Enomoto | 198/370.02 |
| 2007/0215436 A1 * | 9/2007 | Enomoto | 198/370.02 |
| 2008/0116036 A1 * | 5/2008 | Tasma et al. | 198/370.02 |
| 2008/0202893 A1 * | 8/2008 | Veit et al. | 198/370.02 |

FOREIGN PATENT DOCUMENTS

| | | |
|---|---|---|
| DE | 4424110 C1 | 6/1995 |
| EP | 1134172 A1 | 9/2001 |
| EP | 1834906 A2 | 9/2007 |
| NL | 9000393 A | 9/1991 |

OTHER PUBLICATIONS

Search Report for International Patent Application No. PCT/NL2009/050673; Mar. 10, 2010.

* cited by examiner

*Primary Examiner* — Mark A Deuble
(74) *Attorney, Agent, or Firm* — Barnes & Thornburg LLP

(57) ABSTRACT

A device for sorting products including a frame, an endless drivable flexible conveying element, successive elongated carriers, which are each coupled to the conveying element via a coupler for being conveyed in a conveying direction along an endless conveying path, which carriers extend transversely to the conveying direction, and pusher elements which are each movable along a carrier. The coupler including a supporting part and a supported part supported by the supporting part, as well as a connector for detachably connecting the supporting part and the supported part together, wherein the supporting part is coupled to the conveying element and the supported part is connected to a carrier, and wherein the connector can be accessed from the upper side of the supported part for effecting the connection between the supporting part and the supported part.

16 Claims, 7 Drawing Sheets

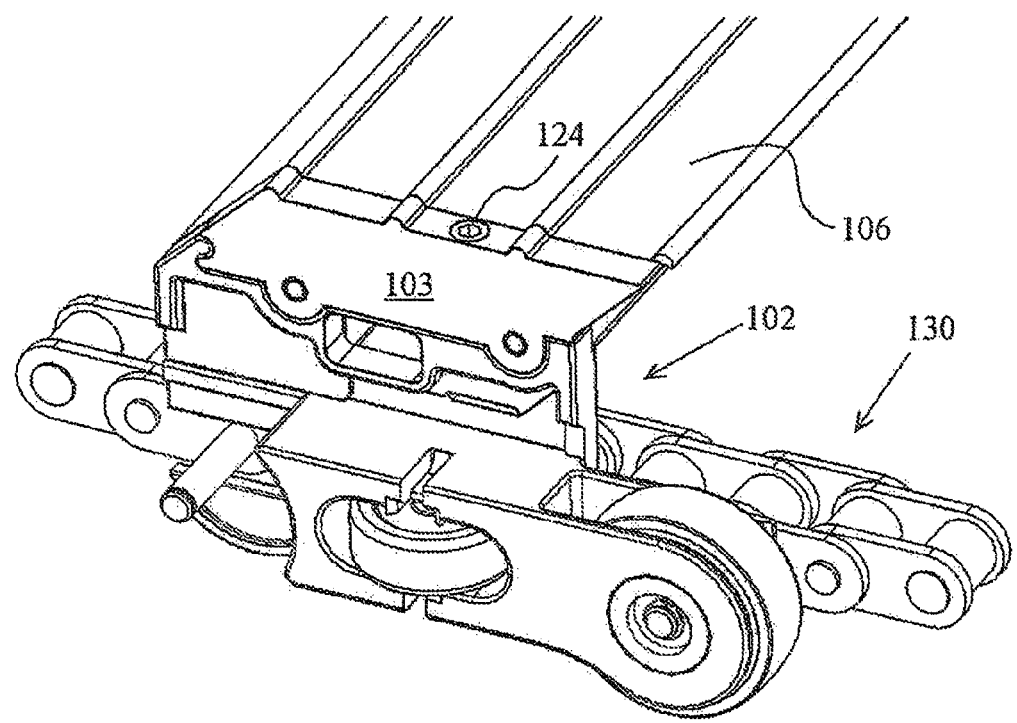
Fig. 5
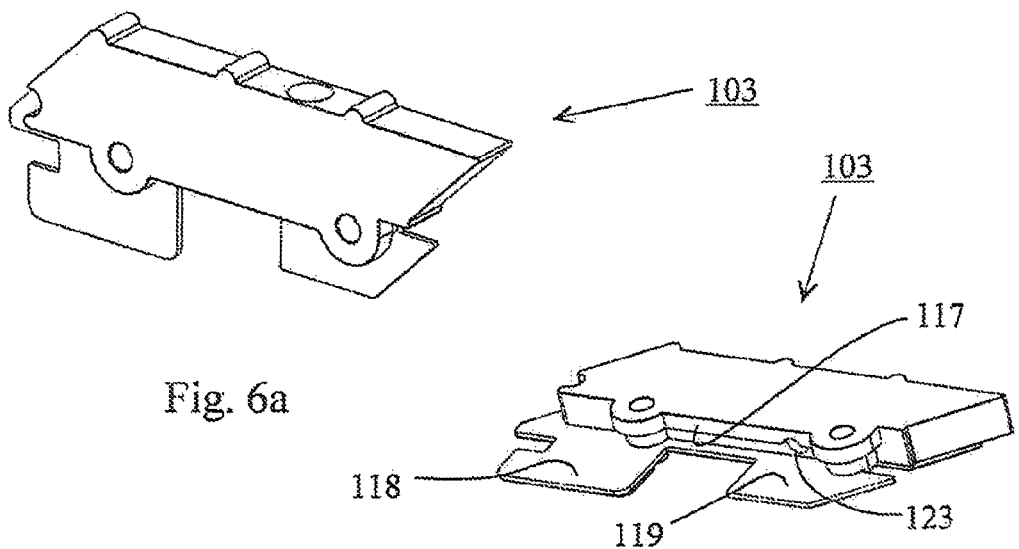
Fig. 6a
Fig. 6b

DEVICE FOR SORTING PRODUCTS

PRIORITY CLAIM

This patent application is a U.S. National Phase of International Patent Application No. PCT/NL2009/050673, filed Nov. 6, 2009, which claims priority to Dutch Patent Application No. 1036169, filed Nov. 7 2008, the disclosures of which are incorporated herein by reference in their entirety.

FIELD

The present invention relates to a device for sorting products, comprising a frame, an endless drivable flexible conveying element, successive elongated carriers, which are each coupled to the conveying element via coupling means for being conveyed in a conveying direction along an endless conveying path, which carriers extend transversely to the conveying direction, and pusher elements which are each movable along a carrier.

BACKGROUND

Such a device is known from Dutch laid-open application NL 9000393. In said known sorting device, the coupling means are at least substantially made up of a vertically oriented plate, which is provided on opposite sides of each carrier. Said plates are connected to an associated conveyor chain on the one hand and to the associated carrier on the other hand. A drawback of the known sorting device is the time required for the maintenance thereof, for example for replacing one carrier or a number of carriers and/or a (number) of pusher shoe(s), or for carrying out maintenance work on stationary guides intended to mate with the pusher shoes that are movable along the carriers, which guides are disposed under the carriers. Such operations involve dismantling the device to a significant extent.

SUMMARY

The object of the present invention is to provide a device as described in the opening paragraph, in which maintenance operations as described above can be carried out more quickly and in a simpler manner, whilst in addition also the installation of the sorting device can take place more quickly and in a simpler manner.

In order to accomplish that object, the coupling means comprise a supporting part and a supported part supported by said supporting part, as well as connecting means for detachably connecting the supporting part and the supported part together, wherein the supporting part is coupled to the conveying element and the supported part is connected to a carrier, and wherein the connecting means can be accessed from the upper side of the supported part for effecting the connection between the supporting part and the supported part. Because of the use of a supporting part and a supported part, which are detachably connected together, with access to the connecting means being possible from the upper side of the supported part, maintenance/installation can take place in a relatively simple manner by detaching the supported part from the supporting part from the upper side. Thus, a carrier can be removed from the conveying element in a simple and quick manner, for example for replacing the carrier or the associated pusher element or for gaining access to the area thereunder.

U.S. Pat. No. 5,595,279 further discloses a device for sorting products, in which, similarly to the aforesaid known device according to NL 9000393, the coupling means are made up of a vertically oriented plate, which is provided with carriers at opposite ends. In the known device according to U.S. Pat. No. 5,595,279, however, respective pairs of adjacent carriers are attached to one plate at their short ends. One pusher shoe is provided for each combination of two carriers thus formed, which pusher shoe is movable along said combination. At their short ends, the carriers are provided with an end plate, which holds the combination of two carriers together. Upon assembly, the combination is secured to the vertical plate by means of two screws, which are screwed through the end plate in lateral, horizontal direction, i.e. in the longitudinal direction of the carrier.

In an advantageous preferred embodiment, the connecting means are elongate in shape and extend in a vertical plane oriented parallel to the conveying direction, which intersects the supported part.

In a constructionally simple yet robust preferred embodiment, the supported part is provided with a through hole which extends in said vertical plane, into which hole the connecting means extend.

It is furthermore advantageous in this regard if a threaded hole is provided in an upper edge of the supporting part, whilst the through hole in the supported part is arranged in line with the threaded hole, with the connecting means comprising a screw which extends through the through hole into the threaded hole. Thus, a robust connection between the supporting part and the supported part is provided in a simple manner, which connection can be accessed from the upper side of the supported part.

In principle it is possible within the framework of the present invention for the carrier and the supported part to be made up of a single, integral part. For constructional reasons it is preferable, however, if the supported part is coupled to a carrier. This implies that the carrier and the supported part are separate parts, which are either detachably or non-detachably, i.e. permanently, coupled together.

Quite preferably, the supported part can be moved away from the supporting part in the non-operative condition of the connecting means, in a direction of movement which is oriented parallel to a vertical plane extending parallel to the conveying direction, for decoupling a carrier and the conveying element from each other. Thus, no use is made upon decoupling the supporting part and the supported part from each other of the space that is present beyond the ends of the carrier in question, including the associated supporting parts and supporting parts, seen in the longitudinal direction of the carriers. As a result, said space remains available for guards that are usually present at the ends in question, and which thus need not be removed (temporarily) for decoupling the supporting part and the supported part from each other. Moving the supported part in the direction of movement can take place by means of translating movement but also by means of pivoting movement, or by means of a combination of the two.

The direction of movement preferably includes an angle with the plane that is oriented perpendicular to the conveying direction, which angle ranges between 0 degrees and 45 degrees. The most optimum angle will depend on the geometry, more specifically the cross-section, of the successive carriers.

In particular if adjacent carriers do not overlap, seen in the conveying direction, it is preferable if the direction of movement is oriented perpendicular to the longitudinal direction of the carrier and to the conveying direction.

Quite preferably, the connecting means can be accessed from a direction of access which includes an angle with the plane defined by the longitudinal direction of the carrier and the conveying direction for the purpose of placing the connecting means in the non-operative position. Preferably, said angle is at least 30 degrees, even more preferably 90 degrees. This provides the technician with a maximum amount of space for carrying out the operations required for placing the connecting means in the non-operative position or, in other words, for decoupling the supporting part and the supported part from each other.

Preferably, a running wheel is coupled to the supporting part for rotation about a preferably horizontal axis of rotation extending transversely to the conveying direction. The running wheel and the carrier are thus connected to different parts (the supporting part and the supported part, respectively), which makes removal easier.

Such an advantage also applies if a guide wheel is coupled to the supporting part for rotation about a vertical axis of rotation, so, that the guide wheel and the carrier are connected to different parts.

According to an important preferred embodiment, the circumference of the supported part is at least substantially the same as the circumference of the associated carrier, or the circumference of the supported part falls at least within the circumference of the associated carrier. It is further advantageous if the circumference of the supported part is at least substantially the same as the inner circumference of the pusher shoe that is movable along the associated carrier, or falls within the latter inner circumference. After the supporting part and the supported part have been decoupled from each other, a pusher element can thus be moved over the supported part onto the carrier or, on the contrary, off said carrier, for example if a pusher element needs to be replaced.

For coupling the supported part to the associated carrier, it is preferable if an insertion portion of the supported part is inserted, preferably clampingly, into a cavity of a carrier from one end of said carrier.

Quite preferably, the connecting means comprise snap means for locking the connecting means in the operative condition. A snap connection is easy to release, possibly by means of a suitable tool.

Preferably, the connecting means form an integral part of one of the supported part and the supporting part. This advantage applies in particular when the aforesaid snap means are used, which snap means preferably form an integral part of the supporting part.

The supporting part and the supported part are made of plastic material, furthermore preferably injection-moulded, making it possible to incorporate as much functionality as possible in one integral part.

BRIEF DESCRIPTION OF THE DRAWINGS

The invention will now be explained in more detail by means of a description of a preferred embodiment of the present invention, in which reference is made to the following figures, in which:

FIG. 5 shows the sorting device of FIG. 4 in coupled condition;

FIG. 6a shows one perspective view of a part of the sorting device shown in FIGS. 4 and 5;

FIG. 6b shows a second perspective view of a part of the sorting device shown in FIGS. 4 and 5;

DETAILED DESCRIPTION

Figure 1:
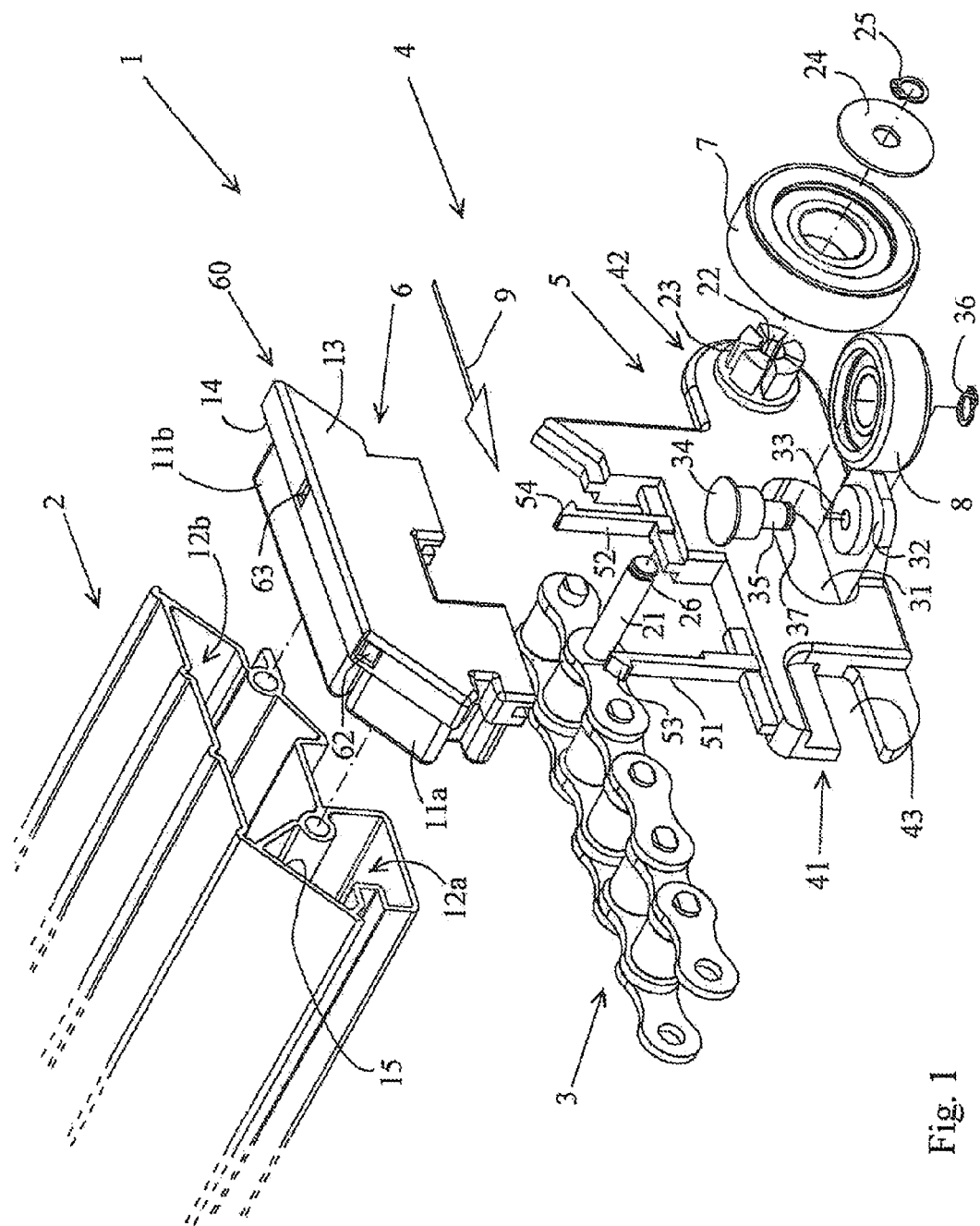
FIG. 1 is an exploded view of a part relevant to the invention of a sorting device according to a first preferred embodiment of the present invention.
Figure 2:
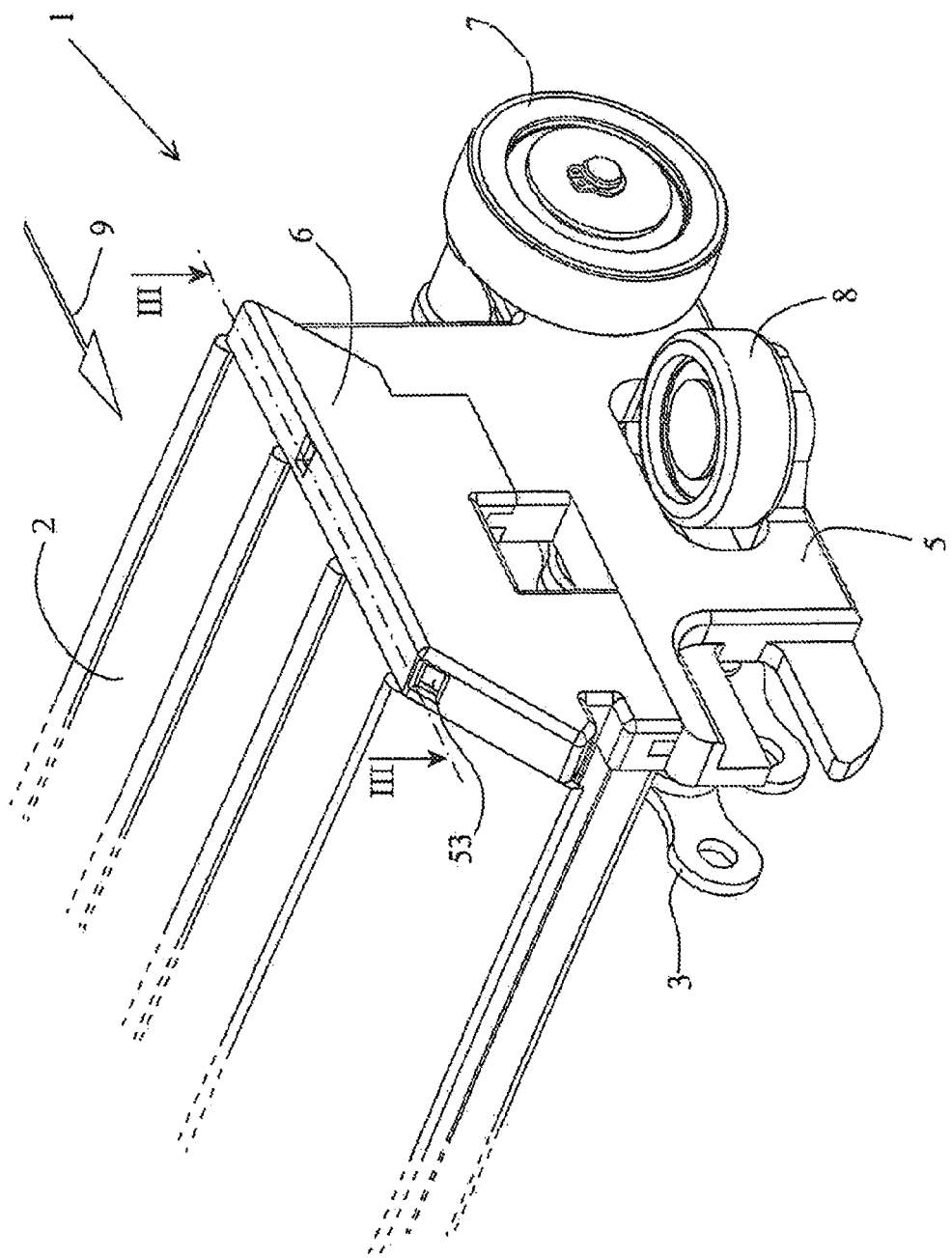
FIG. 2 shows the part of FIG. 1 in assembled condition.
Figure 3:
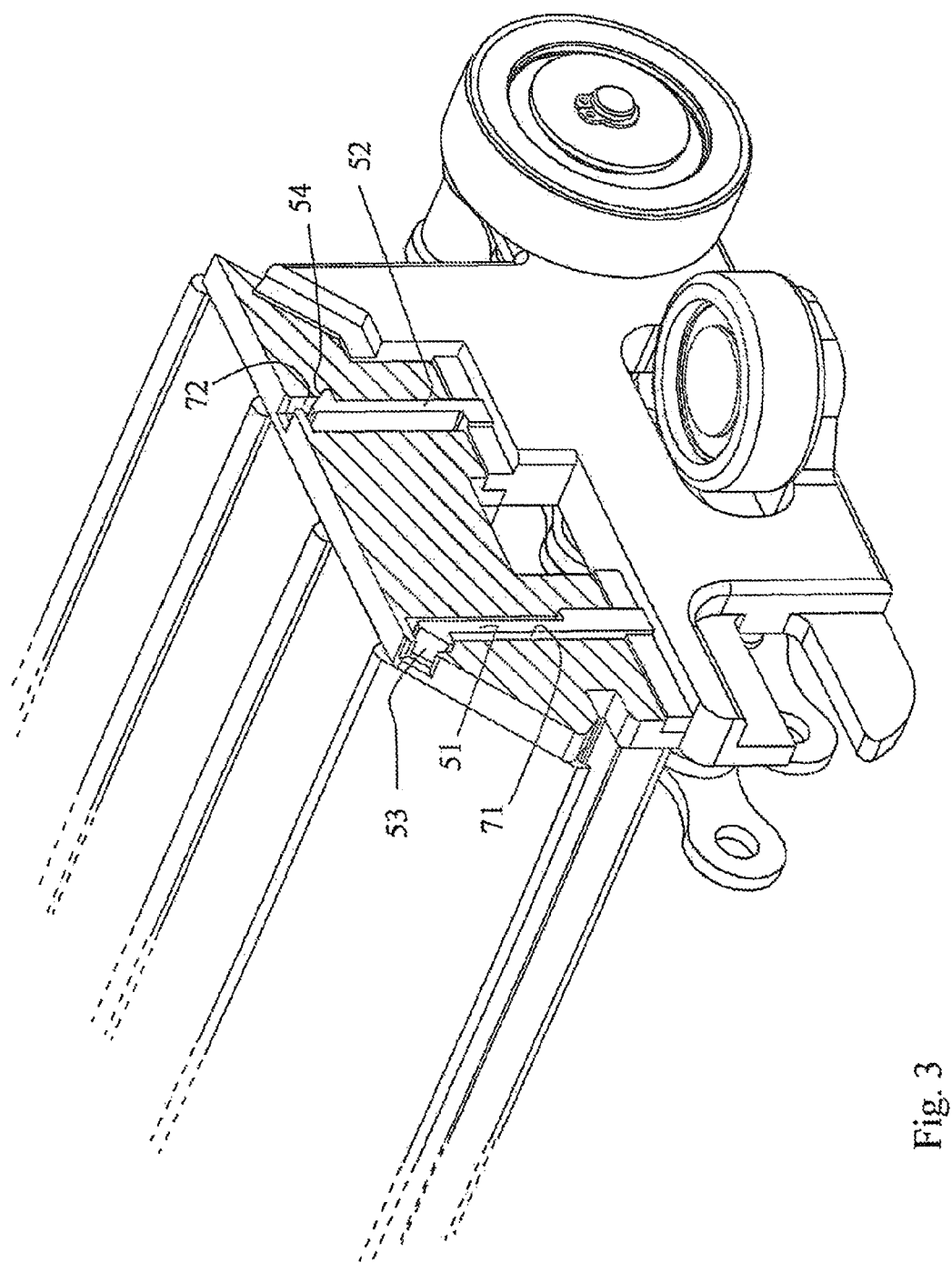
FIG. 3 shows a detail of FIG. 1 in assembled condition, partially in sectional view along the line in FIG. 2.

FIGS. 1, 2 and 3 show a part of a sorting device 1 of the type as disclosed in Dutch laid open application NL 9000393. The sorting device 1 comprises an elongated carrier 2, which is made up of an extruded aluminium section. The carrier 2 is intended on the one hand for supporting thereon, together with other carriers 2, products to be sorted, and on the other hand for guiding a pusher shoe (not shown) therealong for sorting out a product supported by the carrier 2.

The sorting device 1 further comprises, at either end of the carrier 2, an endless conveyor chain 3 extending in the conveying direction of the sorting device 1. Each carrier 2 is coupled at both ends thereof, by means of a coupling element 4, to the conveyor chain 3 that is present at said ends. Because of the presence of the coupling element 4, the carriers 2 and the products to be sorted that are present thereon are moved in the conveying direction when the conveyor chain 3 is driven by drive means {not shown). The coupling element 4 is made up of a supporting part 5 and a supported part 6, which is supported on the supporting part 5. The opposite coupling element 4, which is not shown in FIGS. 1 and 2 and which is also associated with the carrier 2 shown in the figures, is mirror-symmetrical to the coupling element 4 as shown.

The supported part 6 is connected to the carrier 2. The supported part 6 is to that end provided with a number of clamping elements 11a, 11b, which can be clampingly inserted into correspondingly shaped chambers 12a, 12a in the carrier 2. On the outer side, the supported part 6 comprises a lateral member 60 having a lateral surface 13, whose circumference at least substantially corresponds to the cross-section of the carrier 2, so that a pusher shoe can be moved over the supported part 6 onto the carrier 2 or off the carrier 2. The inner side 14 of the lateral member 60 forms a stop surface, via which the supported part 6 abuts against the circumferential edge 15 of the carrier 2.

The supporting part 5 is connected to the conveyor chain 3. The conveyor chain 3 to that end comprises regularly spaced-apart, outwardly extending pivot pins 21, which each clampingly extend into a passage 22 provided in an associated supporting part 5. On the outer side of the supporting part 5, the passage 22 is defined by a number of clamping segment members 23, onto which the running wheel 7 can be clamped. Locking the running wheel 7, and thus also the supporting part 5, to the conveyor chain 5 is done by means of a stop ring 24 and a locking ring 25, which latter ring slips into a groove 26 at the free end of the projecting pivot pin 21.

The supporting part 5 is substantially plate-shaped and comprises an elongated opening 31, which can accommodate part of a guide wheel 8. A horizontal supporting surface 32 extends from the bottom side (at least in FIGS. 1, 2 and 3) of the opening 31, which supporting surface 32 is provided with a passage 33. The guide wheel 8 is coupled for rotation about a vertical axis of rotation to the supporting part by means of a rotation pin 34, a free end 35 of which extends through the passage 33. At the bottom side of the supporting surface 32, the guide wheel 8 is locked by means of a locking ring 36, which slips into a groove 37.

Successive supporting parts 5 partially overlap, seen in the conveying direction. The supporting part 5 is to that end narrowed at the front side (numeral 41), on the side that faces the conveyor chain 3. A recess 43 is provided in the narrowed part 41 for accommodating a pivot pin 21 associated with an adjacent supporting part 5. The diameter of the pin 21 is substantially the same as the height of the recess 43, so that the supporting part 5 remains oriented parallel to the conveyor chain 3. At the rear side of each supporting part 5, where the passage 22 is provided, the supporting part is narrowed (numeral 42) on the side remote from the conveyor chain. The narrowed parts 41 and 42 of successive supporting members 5 overlap.

In the assembled condition, the supporting part 5 and the supported part 6 are coupled by means of a snap connection. Said snap connection comprises vertically oriented spring lips 51, 52, at the upper free ends of which snap hooks 53, 54 are provided. The spring lips 51, 52 extend from the upper side of the supporting part 5 and form an integral part of the supporting part 5. Passages 71, 72 (see FIG. 3) for the spring lips 51, 52 are provided in the lateral member 60. By lowering the supported part 6, or at least the lateral member 60 thereof, over the spring lips 51, 52, with the snap hooks 53, 54 scraping along a wall of the passages 71, 72 with a certain bias, the snap hooks 53, 54 will spring back at a certain point at the ends of the walls in question and hook into the supported part 6.

Starting from the assembled condition shown in FIG. 2, a carrier 2 can be removed in a simple manner by pressing the snap hooks 53, 54 together, whether or not by means of suitable tools to be passed through the mouths 62, 63 of the passages 71, 72, and subsequently moving the carrier 2 and the associated supported parts 6 upwards, thereby releasing the snap connection between the supporting part 5 and the supported part 6.

When products are being sorted, translating movement of pusher shoes causes products to move along the carriers 2, away from the conveying device, seen in the longitudinal direction of the carrier, or external (pusher) means move products onto the carriers of the conveying device. It is important in this regard that the products cannot get near the conveyor chain 3, the running wheels 7, the guide wheels 8 and parts at least associated therewith. In the assembled condition of the sorting device, the sorting device therefore comprises guards fixedly mounted to a frame of the sorting device, which guards extend in the conveying direction 9, and which are disposed at the sides of the carriers, extending over the whole of the conveyor chain 3 etc. When a product is thus forced sideways off the conveying device, the product in question will slide over the upper surface of a carrier (or carriers), via the upper surface of the supported part, onto or over the guard, and is then further discharged. It is important, therefore, that the guards abut lateral surfaces of the supported parts, such as the lateral surface 13 of the supported part 6 of FIG. 1, as closely as possible, thus forming one continuous surface, as it were, with the upper side of the supported part 6 and the carrier 2.

A major advantage of the device according to the present invention is that the connecting means between a supporting part and the associated supported part, such as the snap hooks 51, 52 of the supporting part 5, can be accessed from the upper side of the associated supported part 6. Within this context, the phrase "from the upper side" is understood to mean that the snap hooks can be accessed from above, within the vertical range defined by the lateral surface 13 (i.e. on the side of the carrier) of the supported part 6. The aforesaid guards thus need not be removed when a carrier is to be removed, so that said removal will take less time. This also applies, for that matter, to the further preferred embodiments of devices according to the present invention yet to be described hereinafter. This in contrast to the known, prior art devices as described above, in which the connecting means can be accessed from the side of a coupling element, and in which guards need to be removed first when a carrier is to be removed in order to make the connecting means accessible at all to tools.

FIGS. 4-6b relate to a sorting device 101, being a second preferred embodiment of a sorting device according to the present invention. The sorting device 101 is to a certain extent comparable to the sorting device 1 as regards its construction. Below, in particular those aspects of the sorting device 101 that are different from the sorting device 1 will be discussed.

The sorting device 101 comprises a supporting part 102 and a supported part 103, which is supported on the supporting part 102 in use. Both parts 102, 103 are injection-moulded plastic products. The supporting part 102 comprises a running wheel 104 and a guide wheel 105, it is coupled to a conveyor chain 130 associated with the sorting device 101, in a manner comparable to the manner in which the supporting part 5 is coupled to the conveyor chain 3.

Figure 4:
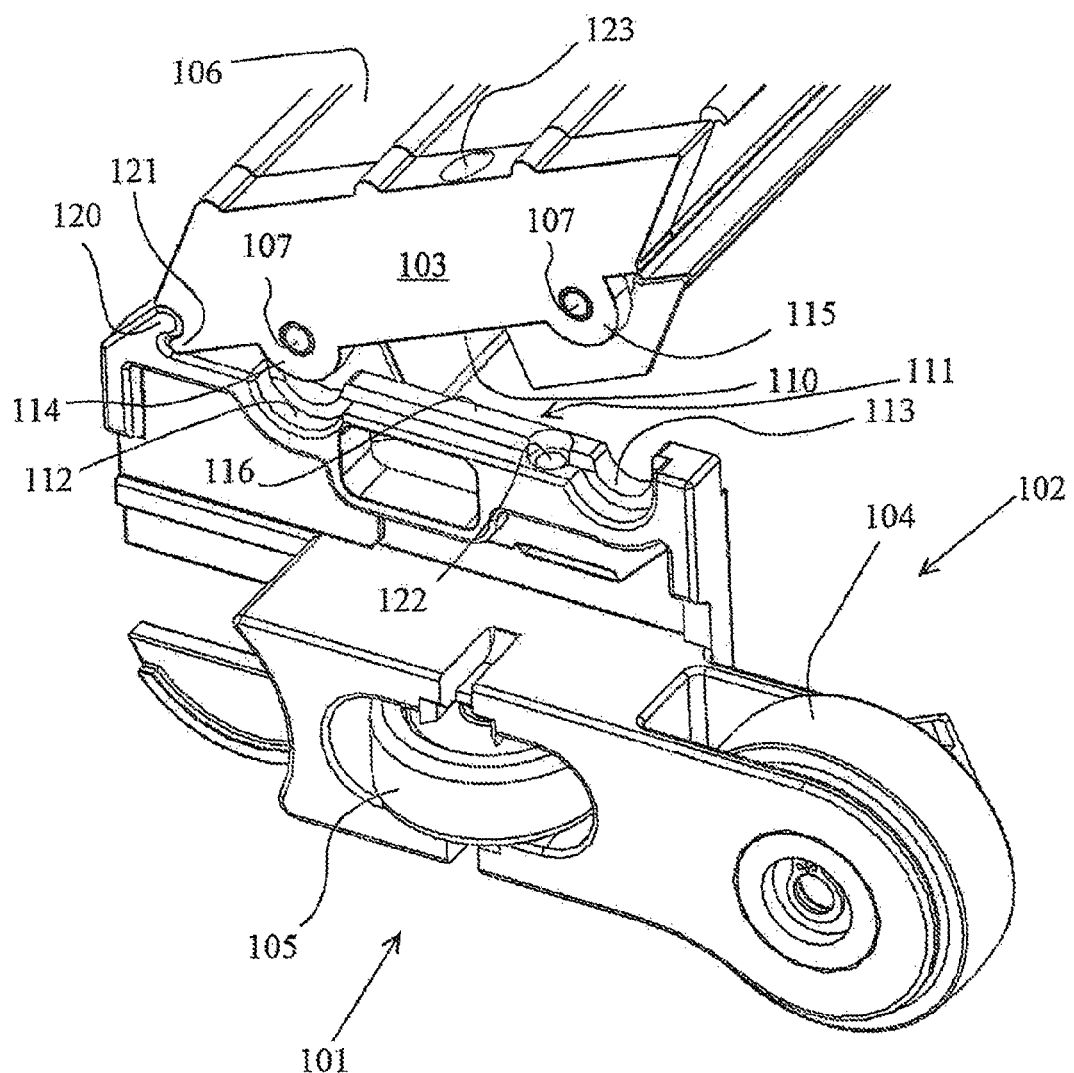
FIG. 4 is a perspective view of a part relevant to the invention of a sorting device according to a second preferred embodiment of the present invention in decoupled condition.

The supported part 103 (see also FIGS. 6a and 6b) corresponds as regards its shape to the carrier 106 to which the supported part 103 is connected, which carrier is shown along part of its length in FIGS. 4 and 5. The supported part 103 has the aforesaid corresponding shape, in particular as far as the upper side of the carrier 106 is concerned. For the rest it is in any case relevant to note that the circumference of the supported part 103 falls within the inner circumference (vertical cross-section) of the pusher shoe that is movable along the associated carrier, so that pusher shoes associated with the carrier 106 can slide over the supported part 103. Preferably, the circumference of the supported part 103 also falls within the circumference (vertical cross-section) of the carrier 106. The supported part 103 is coupled to the associated carrier 106 by means of dowel pins 107, which are inserted into through holes, which (as shown for the carrier 2 in FIG. 1) extend through the carrier 106. In principle this connection between the supported part 103 and the carrier 106 is a permanent connection.

The geometry of the bottom edge 110 of the supported part 103 and the upper edge 111 of the supporting part 102 are to a significant extent complementary. Thus the upper edge 11 comprises two semicircular recesses 112, 113, in which semicircular ears 114, 115 at the bottom edge 110 of the supported part 103 fit, as is shown in FIG. 5 for the situation in which the supporting part 102 fully supports the supported part 103 in the coupled condition. The bottom edge 110 and the upper edge 111 further comprise raised edge portions 116, 117 over practically their entire length, which edge portions are positioned beside each other in the coupled condition shown in FIG. 5. The effect that is thus achieved is that the supporting part 102 and the supported part 103 will be correctly positioned relative to each other, also in the longitudinal direction of the carrier 102, in the coupled condition shown in FIG. 5.

The supported part 103 to that end further comprises two stop plate portions 118, 119 which, in the coupled condition shown in FIG. 5, abut against the side of the supporting part 102 that faces the carrier 106.

The supporting part 102 and the supported part 103 further comprise two mating curved hook members 120, 121, which enable the supported part 103 to pivot relative to the supporting part 102 about a virtual pivot axis which extends horizontally, parallel to the longitudinal direction of the carrier 106 through the centre of the hook member 120. This is in particular advantageous because of the parallelogram-like cross-section of the carrier 106, which makes it more advantageous upon coupling the supported part 103 to the supporting part 102 or, in other words, the carrier 106 to the conveyor chain 130, to insert the carrier 106 at a slight angle between the two adjacent carriers instead of exactly vertically.

To couple the supported part 103 to the supporting part 102 in the situation shown in FIG. 5, a threaded hole 122 is provided in the upper edge 111 of the supporting part 102, whilst a through hole 123 having an enlarged diameter at the upper side is formed in the supported part 103, in line with said threaded hole 122. The coupling in question between the supported part 103 and the supporting part 102 is effected by tightening a socket screw 124 which extends through the through hole 123 and which engages in the threaded hole 122 with its screw thread. Said coupling can be released again just as easily, of course, by turning the socket screw in the opposite direction. The threaded hole 122, the through hole 123 as well as the socket screw 124 thus extend in a vertical plane which is oriented parallel to the conveying direction 9 and which intersects the supported part 103. The same applies, for that matter, to the spring lips 51, 52 as described in the foregoing.

To tighten the socket screw 124, access to said socket screw can be gained in a very simple manner from the upper side of the supported part 103. Thus it is not necessary in the preferred embodiment of FIGS. 4-6b, no more so than in the above-described preferred embodiments of FIGS. 1-3, to remove guards of the sorting device first when a carrier is to be removed, since the connecting means, more specifically the socket screw 124, can be accessed from the upper side of the supported part 103 for effecting or releasing, as the case may be, the connection between the supported part 102 and the supported part 103.

An alternative embodiment of the sorting device 101 does not comprise the supported part 103 as a separate part, whilst the geometry of the upper edge 111 of the supporting part 102 is adapted to the geometry of the underside of the carrier 106. The through hole 123 is formed in the ends of the carrier 106, which is slightly extended, so that the holes 123 will be aligned with the threaded holes 122. It is also conceivable to provide two through holes for each end of the carrier 106, which holes are located one behind another, seen in the conveying direction. It stands to reason that also the position of the threaded holes 122 and the number of threaded holes will have to be adapted in that case. The supported part is integrated in (the ends of) the carrier 106 in this alternative embodiment.

FIGS. 7-10 relate to a sorting device 201, being a third preferred embodiment of a sorting device according to the invention. The sorting device 201 is quite similar to the previously discussed sorting devices 101 and 1. Hereinafter in particular those aspects that set the sorting device 201 apart from the sorting devices 1 and 101 will be discussed.

Figure 10:
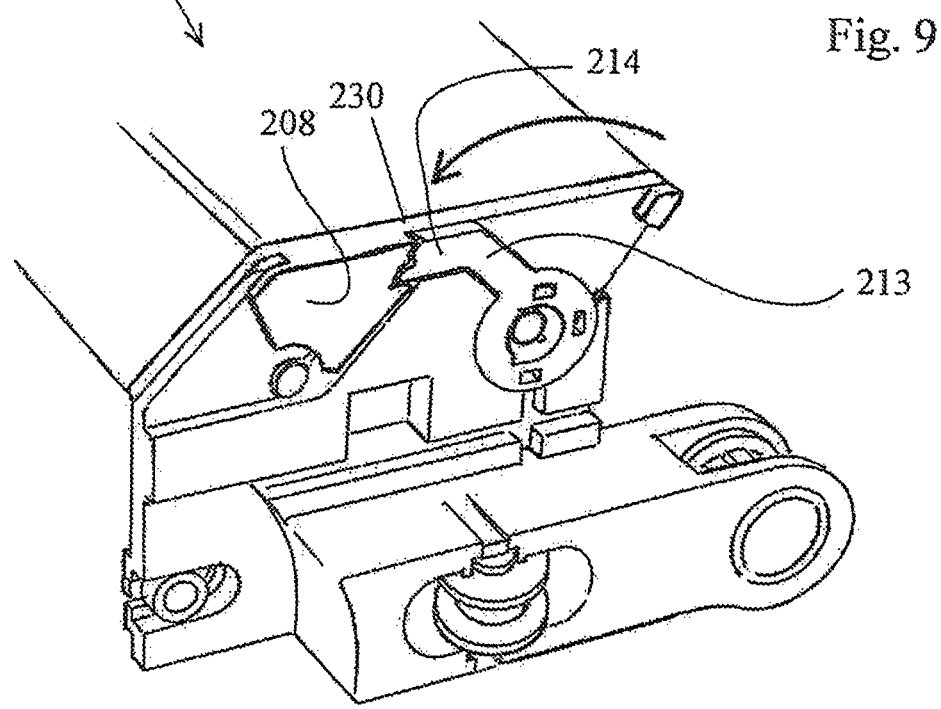
FIG. 10 shows, in a third successive stage, the changeover from a decoupled condition to a coupled condition of a sorting device according to a third preferred embodiment of the present invention.

The sorting device 201 comprises a supporting part 202 of plastic material and a supported part 203 of plastic material. The supporting part 202 is connected to a conveyor chain (not shown), whilst the supported part 203 is connected to a carrier 204, being supported on the supporting part 202 in use (FIG. 10). The supported part 203 is substantially plate-shaped and comprises two projections 205, 206 on the side remote from the carrier 204, which projections extend from the main plate 207 of the supported part 203. In addition to that, the supported part 203 comprises an at least substantially triangular retaining plate 208 on the side of the projections 205, 206, at some distance from the main plate 207.

The supporting part 202 comprises an inclined slot 211 and a straight slot 212, which slots have open ends at the upper side of the supporting part 202. The supporting part 202 further comprises a retaining handle 213, which is pivotally accommodated in the slot 212, which handle projects from the upper side of the supporting part 202 with a control portion 214 in the situation shown in FIG. 7, in which the supporting part 202 and the supported part 203 are not coupled. At the opposite end of the control portion 214, the retaining handle 213 comprises a disc-shaped end part 215 provided with a central opening 216, which is in line with the end of the slot 212. The end part 215 is provided with retaining projections 217a, 217b and 217c at three quarter positions, which projections are located just outside the diameter of the central opening 216.

Figure 7:
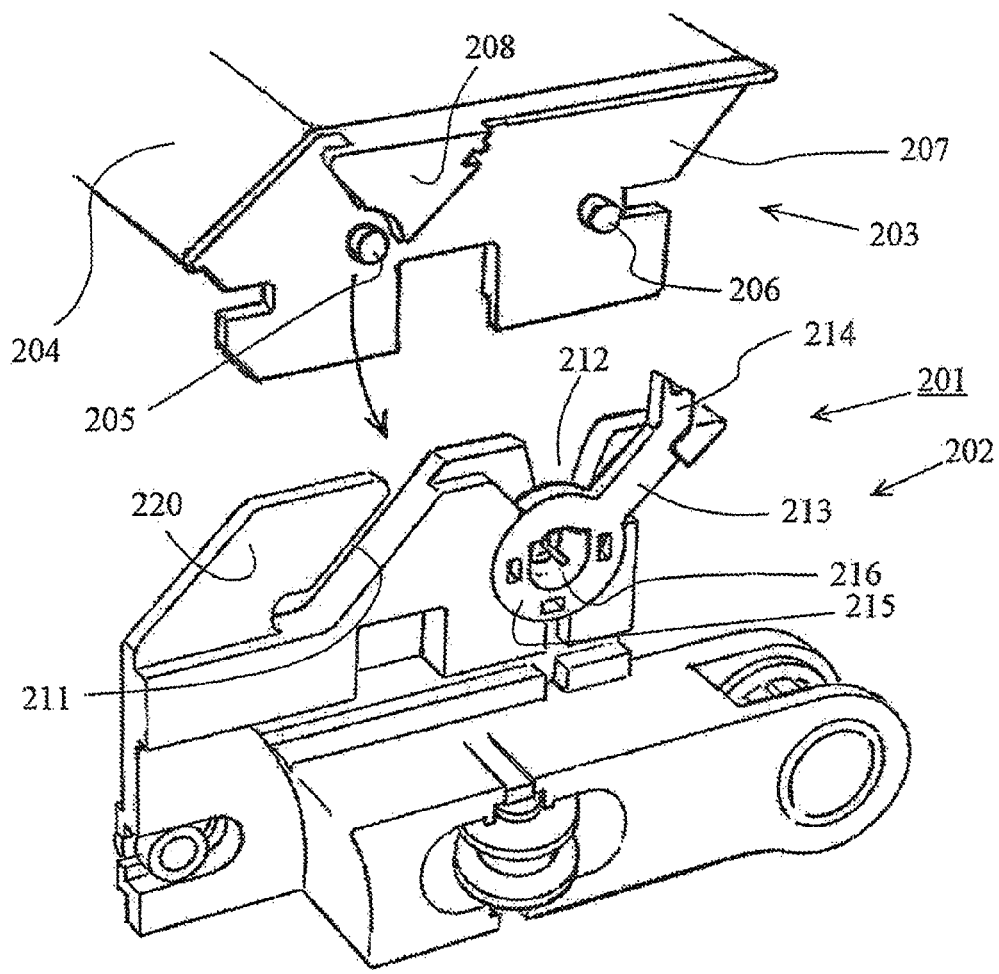
FIG. 7 shows, in a first successive stage, the changeover from a decoupled condition to a coupled condition of a sorting device according to a third preferred embodiment of the present invention.
Figure 8:
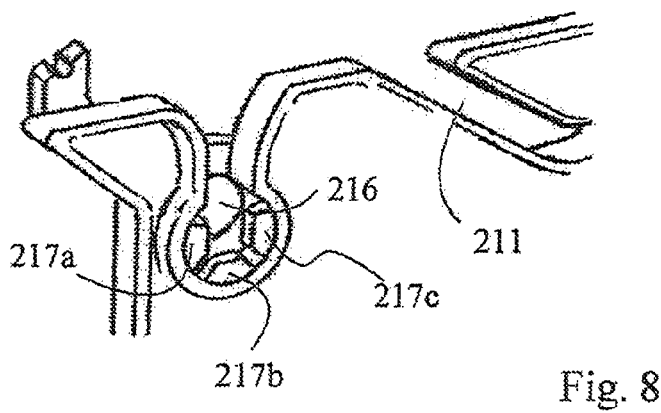
FIG. 8 shows a detail of FIG. 7 from a different perspective.
Figure 9:
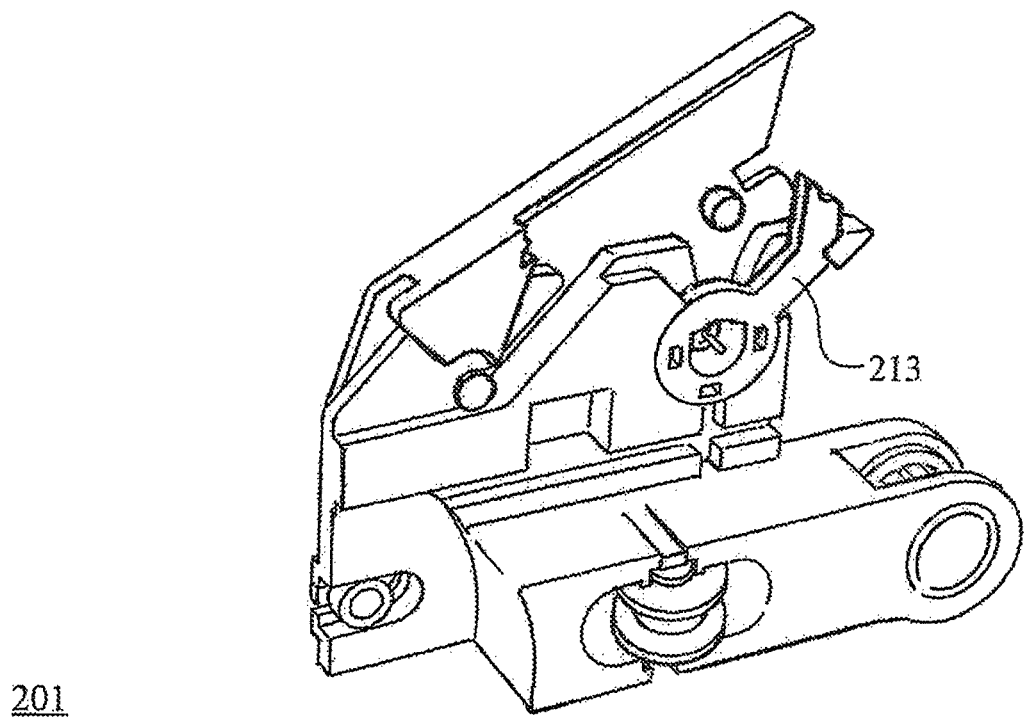
FIG. 9 shows, in a second successive stage, the changeover from a decoupled condition to a coupled condition of a sorting device according to a third preferred embodiment of the present invention.

The retaining handle 213 can be pivoted between the open position shown in FIGS. 7 and 9 and the closed position shown in FIG. 10 by suitably controlling the retaining handle 213 via the control portion 214, in which latter position the retaining projection 217a closes the end of the slot 212.

The coupling of the supported part 203 to the supporting part 202 or, in other words, of the carrier 204 to the associated conveyor chain, takes place in the manner shown in the successive FIGS. 7, 9 and 10. Initially, the projection 205 is moved into the inclined slot 211, as far as the end thereof (FIG. 9). As a result, the alignment plate portion 220 of the supporting part 202 is positioned, at least partially so, between the main plate 207 and the stop plate 208 of the supported part 203. The supported part 203 then pivots downwards about a horizontal pivot axis which extends through the centre of the projection 205, with the projection 206 also being stopped at the bottom of the groove 212. The projection 205 thus comes to be positioned between the retaining projections 217a and 217c. Substantially, the retaining handle 213 is manually moved to the position shown in FIG. 10, in which the retaining projection 217a is positioned above the projection 206, which is thus retained in position. The position of the retaining handle 213 is secured by means of a snap connection 230, which acts between the control portion 214 and the stop plate 208. Thus there is no need in the preferred embodiments shown in FIGS. 7-10, no more so than in the above-described preferred embodiments shown in FIGS. 1-3 and FIGS. 4-6b, to remove guards from the sorting device first when a carrier is to be removed, since the connecting means, more specifically the retaining handle 213, can be accessed from the upper side of the supported part 203 for effecting or releasing, as the case may be, the connection between the supporting part 202 and the supported part 203.

In a simplified alternative embodiment of the sorting device 201, the supported part 203 could be made up merely of two pins, functioning as projections 205, 206, which project outside the section forming the carrier 204 and which are supported on supporting surfaces present in the supporting part 202. Said pins could be permanently or detachably inserted into holes of the section, as shown in FIG. 1 for the section 2.

The invention claimed is:

1. A device for sorting products, comprising an endless drivable flexible conveying element, successive elongated carriers for pusher elements which are movable along the carrier, which carriers are each coupled to the conveying element via coupling means for being conveyed in a conveying direction along an endless conveying path, which carriers extend transversely to the conveying direction, wherein the coupling means comprise a supporting part and a supported part supported by said supporting part, as well as connecting means for detachably connecting the supporting part and the supported part together, wherein the supporting part is coupled to the conveying element and the supported part is connected to a carrier, wherein the connecting means can be accessed from the upper side of the supported part for effecting the connection between the supporting part and the supported part, wherein the connecting means are elongate in shape and extend in a vertical plane oriented parallel to the conveying direction, which intersects the supported part.

2. The device according to claim 1, wherein the supported part is provided with a through hole which extends in said vertical plane, into which hole the connecting means extend.

3. The device according to claim 2, wherein a threaded hole is provided in an upper edge of the supporting part, while the through hole in the supported part is arranged in line with the threaded hole, with the connecting means comprising a screw which extends through the through hole into the threaded hole.

4. The device according to claim 1, wherein said supported part is coupled to a carrier.

5. The device according to claim 1, wherein the supported part can be moved away from the supporting part in the non-operative condition of the connecting means, in a direction of movement which is oriented parallel to a vertical plane extending parallel to the conveying direction, for decoupling a carrier and the conveying element from each other.

6. The device according to claim 5, wherein the direction of movement includes an angle with the plane that is oriented perpendicular to the conveying direction, which angle ranges between 0 degrees and 45 degrees.

7. The device according to claim 1, wherein the connecting means can be accessed from a direction of access which includes an angle with the plane defined by the longitudinal direction of the carrier and the conveying direction for the purpose of placing the connecting means in the non-operative position, wherein the angle which the direction of access includes with the plane defined by the longitudinal direction of the carrier and the conveying direction is at least 30 degrees.

8. The device according to claim 7, wherein the angle which the direction of access includes with the plane defined by the longitudinal direction of the carrier and the conveying direction is 90 degrees.

9. The device according to claim 1, wherein a running wheel is coupled to the supporting part for rotation about a horizontal axis of rotation extending transversely to the conveying direction.

10. The device according to claim 1, wherein a guide wheel is coupled to the supporting part for rotation about a vertical axis of rotation.

11. The device according to claim 1, wherein the circumference of the supported part is at least substantially the same as the circumference of the associated carrier or falls within the latter circumference.

12. The device according to claim 1, wherein the circumference of the supported part is at least substantially the same as the inner circumference of the pusher shoe that is movable along the associated carrier, or falls within the latter inner circumference.

13. The device according to claim 4, wherein an insertion portion of the supported part is inserted, preferably clampingly, into a cavity of a carrier from one end of said carrier.

14. The device according to claim 1, wherein the connecting means comprise snap means for locking the connecting means in the operative condition.

15. The device according to claim 1, wherein the connecting means form an integral part of one of the supported part and the supporting part.

16. The device according to claim 1, wherein the supporting part and the supported part are made of plastic material.

* * * * *